(12) United States Patent
Veenstra et al.

(10) Patent No.: US 7,584,456 B1
(45) Date of Patent: Sep. 1, 2009

(54) METHOD AND APPARATUS FOR DEBUGGING EMBEDDED SYSTEMS HAVING READ ONLY MEMORY

(75) Inventors: Kerry Veenstra, Santa Cruz, CA (US); Tim Allen, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 945 days.

(21) Appl. No.: 11/035,699

(22) Filed: Jan. 14, 2005

(51) Int. Cl.
*G06F 9/45* (2006.01)
(52) U.S. Cl. .................................... 717/124
(58) Field of Classification Search .................. 717/124
See application file for complete search history.

(56) References Cited

U.S. PATENT DOCUMENTS 7,343,496 B1 * 3/2008 Hsiang et al. ............... 713/194
2001/0034880 A1 * 10/2001 Dzoba et al. ................ 717/4
2003/0005417 A1 * 1/2003 Gard et al. ................ 717/135

\* cited by examiner

*Primary Examiner*—John Chavis
(74) *Attorney, Agent, or Firm*—Martine Penilla & Gencarella, LLP

(57) ABSTRACT

A programmable logic device (PLD) is provided. The PLD includes a microprocessing unit (MPU) and a memory region functioning in a read only state. A Joint Test Action Group (JTAG) debug module in communication with the memory region is included in the PLD. The JTAG debug module is able to detect a breakpoint causing an interruption of a processing sequence executed by the MPU. Write control circuitry capable of issuing a signal enabling the memory region to transition from the read only state disallowing writes to a second state accepting write data from the MPU is included in the JTAG debug circuitry. In one embodiment, the write control circuitry issues the signal in response to a breakpoint induced either through hardware or software. A method of debugging a PLD is also provided.

20 Claims, 5 Drawing Sheets

METHOD AND APPARATUS FOR DEBUGGING EMBEDDED SYSTEMS HAVING READ ONLY MEMORY

BACKGROUND

This invention relates generally to integrated circuit design and, in particular, to debugging a programmable logic device.

In the field of electronics, various electronic design automation (EDA) tools are useful for automating the process by which integrated circuits, multi-chip modules, boards, etc., are designed and manufactured. In particular, electronic design automation tools are useful in the design of standard integrated circuits, custom integrated circuits (e.g., ASICs), and in the design of custom configurations for programmable integrated circuits. Integrated circuits that may be programmable by a customer to produce a custom design for that customer include programmable logic devices (PLDs). As used herein programmable logic devices refer to any integrated circuit that may be programmed to perform a desired function and include programmable logic arrays (PLAs), programmable array logic (PAL), field programmable gate arrays (FPGA), complex programmable logic devices (CPLDs), and a wide variety of other logic and memory devices that may be programmed. Often, such PLDs are designed and programmed by a design engineer using an electronic design automation tool that takes the form of a software package.

In the course of generating a design for a PLD, programming the PLD and checking its functionality on the circuit board or in the system for which it is intended, it is important to be able to debug the PLD because a design is not always perfect the first time. Before a PLD is actually programmed with an electronic design, a simulation and/or timing analysis may be used to debug the electronic design.

Once the PLD is actually programmed with the electronic design after initial debugging, a customer or potential user may wish to evaluate the PLD. At this point, the customer/potential user may want to modify the boot memory contents. The program update of the boot memory is time consuming because a hardware compilation is required since the boot memory is in a read-only state. That is, the program contained in on-chip memory requires changing software, compiling that software and then compiling the design to update the configuration. Thus, a software design engineer may wait for up to an hour when making minor modifications, which hampers progress in fixing a program or a design.

As a result, there is a need to solve the problems of the prior art to more efficiently enable the modification of a boot memory contained within a PLD.

SUMMARY

Broadly speaking, the present invention fills these needs by providing a method and apparatus for more efficiently debugging a PLD design by temporarily allowing the boot memory to be written to. It should be appreciated that the present invention can be implemented in numerous ways, including as a method, a system, or a computer readable medium. Several inventive embodiments of the present invention are described below.

In one aspect of the invention, a method for debugging a microprocessor system within a programmable logic device is provided. In the method, a debug mode is detected and on-chip memory acting as boot memory that has a write port de-asserted is transitioned to accept writes. The contents of the on-chip memory may then be modified without requiring a full hardware recompilation. Once the contents of the boot memory are modified, the ability of the on-chip memory to accept writes is terminated. In one embodiment, the method may be implemented through program instructions on a computer readable medium.

In another aspect of the invention, a programmable logic device (PLD) is provided. The PLD includes a microprocessing unit (MPU) and a memory region functioning in a read only state. A Joint Test Action Group (JTAG) debug module in communication with the memory region is included in the PLD. The JTAG debug module is able to detect a breakpoint causing an interruption of a processing sequence executed by the MPU. Write control circuitry capable of issuing a signal enabling the memory region to transition from the read only state disallowing writes to a second state accepting write data from the MPU is included in the JTAG debug circuitry. In one embodiment, the write control circuitry issues the signal in response to a breakpoint induced either through hardware or software.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for a system and method for debugging a programmable logic device. It will be obvious, however, to one skilled in the art, that the present invention may be practiced without some or all of these specific details. In other instances, well known process operations have not been described in detail in order not to unnecessarily obscure the present invention.

A system and method for efficiently debugging a programmable logic device (PLD) having a configuration stored in a memory functioning in a read only state is provided. In a PLD, such as programmable logic arrays (PLAs), programmable array logic (PAL), field programmable gate arrays (FPGA), complex programmable logic devices (CPLDs), and a wide variety of other logic and memory devices that may be programmed, the memory regions are designed as a random access memory (RAM) initially. However, some of the memory regions are configured to have the write port for the RAM disabled so that the memory regions function as a read only memory (ROM) and cannot accept writes. The embodiments described in more detail below exploit the fact that the memory regions within a general purpose PLD can temporarily be transitioned to enable the acceptance of writes even when the memory regions are functioning as a ROM. In one embodiment, hardware debugging circuitry included in the PLD design issues a write control signal to the memory region or regions functioning as a ROM in order to temporarily enable the configuration contained therein to be modified. In another embodiment, the debugging circuitry can also set software breakpoints in the stored configuration in order to eliminate the necessity of hardware breakpoint circuitry.

Figure 1:
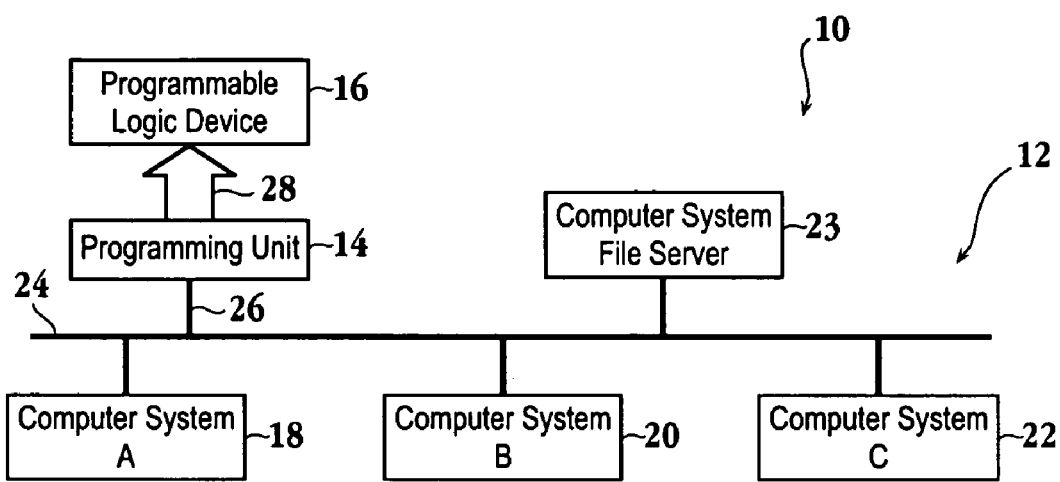
FIG. 1 is a block diagram of an embodiment of a programmable logic development system that includes a computer network, a programming unit and a programmable logic device that is to be programmed.

FIG. 1 is a block diagram of an embodiment of a programmable logic development system 10 that includes a computer network 12, a programming unit 14 and a programmable logic device 16 that is to be programmed. Computer network 12 includes any number of computers connected in a network such as computer system A 18, computer system B 20, computer system C 22, and computer system file server 23, all connected together through a network connection 24. Computer network 12 is connected via a cable 26 to programming unit 14, which in turn is connected via a programming cable 28 to the PLD 16. Alternatively, only one computer system could be directly connected to programming unit 14.

Programming unit 14 may be any suitable hardware programming unit that accepts program instructions from computer network 12 in order to program PLD 16. By way of example, programming unit 14 may include an add-on logic programmer card for a computer, and a master programming unit, such as are available from the assignee. PLD 16 may be present in a system or in a device programmer. In operation, any number of engineers may use computer network 12 in order to develop programming instructions using an electronic design automation software tool. Once a design has been developed and entered by the engineers, the design is compiled and verified before being downloaded to the programming unit. The programming unit 14 is then able to use the downloaded design in order to program PLD 16.

Figure 2:
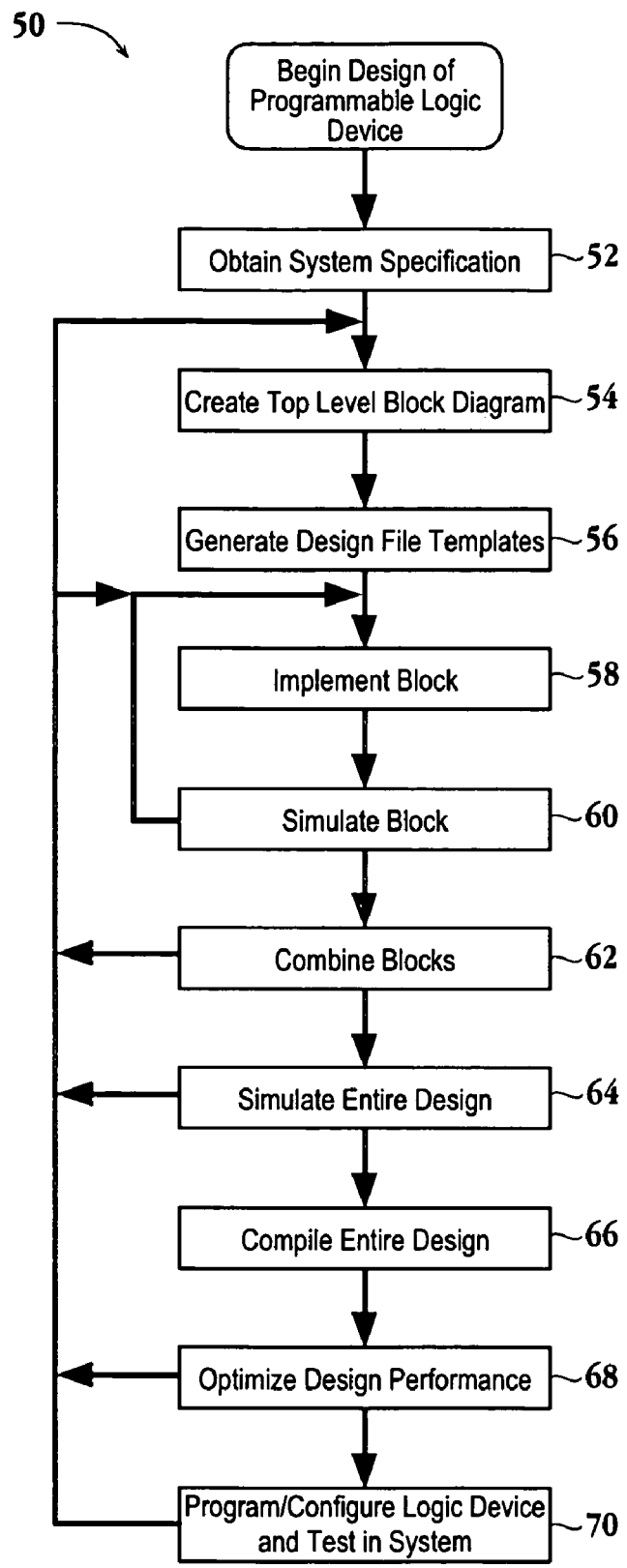
FIG. 2 is a flowchart diagram illustrating a design methodology for using a system design specification in order to develop a design with which to program a programmable logic device (PLD).

FIG. 2 is a flowchart diagram illustrating a design methodology 50 for using a system design specification in order to develop a design with which to program a PLD. It should be appreciated that the present invention may be practiced in the context of a wide variety of design methodologies. By way of example, the work group computing techniques and system of the present invention work well with an electronic design automation (EDA) software tool within the framework of the methodology of FIG. 2. In operation 52 a system specification for the PLD to be programmed is obtained. This specification is an external document or file that describes, for example, the device pin names, the functionality of each of the pins, the desired system functionality, timing and resource budgets, and the like. The multiple engineers within a work group will use this system specification in order to create a design with the EDA tool that will then be used to program a PLD.

Once the system specification is obtained, creation of a design using functional block diagrams begins. In operation 54 a top-level block diagram is created in which connections between lower-level designs blocks are specified. In this block, the target device, speed grade, and key timing requirements may be specified. This top-level block may also be converted into a hardware description language (HDL) file, or the like, for use in other related design tools, such as an external simulator. Operation 56 of FIG. 2 includes generating design file templates with the EDA tool for all blocks present in the top-level block diagram of operation 54. After the designer has created a block which has not yet been implemented, the system may generate a design file template. Such templates may display a block in a window format including, for example, a title, a date, etc. around the boundaries. It may also include some details of the functional content depicted within the window. The design file templates may be in any specified design format including VHDL, AHDL, Verilog, block diagram, schematic, or other like format. In the case of a VHDL block the template may also include much of the formatting and necessary syntax for any VHDL block.

Next, in operation 58, each of the blocks of the top-level block is implemented using the EDA tool. It is noted that for more complicated designs, there may be additional levels of block diagrams (i.e., blocks within blocks). If changes are required at the top-level then the top-level block diagram is updated and the sub-designs are preferably automatically updated as well.

Furthermore, a block may be compiled through to a fitting stage for a particular integrated circuit die to provide information about resource utilization, timing performance, etc., as required for a given design. As such, it is envisioned that some timing optimization may be performed during operation 58. This sequence illustrates a style of design in which an engineer first designs, then compiles and simulates, and then returns to design again if the simulation results are not satisfactory. In another style, an engineer may iterate through a number of design followed by simulation loops before finally compiling the complete design. In operation 60 a block is simulated functionally at the source level using a behavioral simulator and vectors generated by using a VHDL or Verilog test bench, for example. The simulation results are then displayed or otherwise presented/recorded as waveforms, text or annotated onto the source files. The designer may also return to operation 58 to implement a block again. Also, at this point a block may be compiled or a timing analysis performed. In one embodiment, each block is implemented and simulated individually.

Still referring to FIG. 2, once the designer is satisfied with the simulation results, in operation 62 various pairs or combinations of blocks may be combined and simulated together as a group. In some cases, it may be useful to complete a full compilation to provide critical resource and timing information. Also, output simulation vectors from one block may become the input simulation vectors to the next block. The designer may also return to operation 54 to modify the top-level block or to operation 58 to implement a block again.

Next, in operation 64, the entire design is simulated functionally at the source level using a behavioral simulator. Again, the simulation results can be displayed either as waveforms or annotated onto the source files. The designer may also return to operation 54 to modify the top-level block or to operation 58 to implement a block again. In operation 66 the entire design is compiled through to a file containing the information needed to program a PLD to implement the user's design, such as to a "programming output file." It should be appreciated that a wide variety of compile techniques may be used depending upon the type of design being created.

Following compilation in operation 66, in operation 68 the timing checker inside the compiler is used to determine if the performance goals for the design have been met. Also, timing simulations are used to check performance details. In addition, other analysis tools such as a design profiler and/or layout editor can be used to further optimize the performance of the design. Next, in operation 70 the device is programmed using programming unit 14 (FIG. 1) and tested in the system.

Again, the designer may also return to operation 54 to modify the top-level block or to operation 58 to implement a block again.

Figure 3:
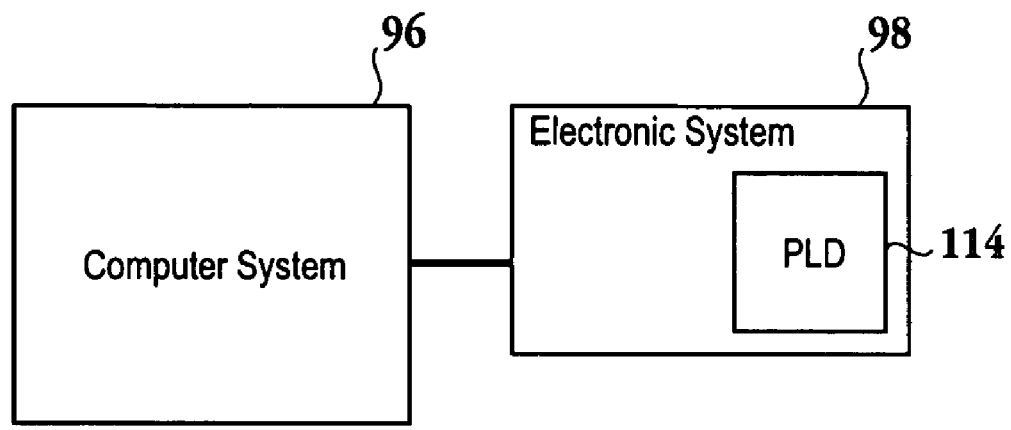
FIG. 3 is a simplified schematic diagram illustrating a system to test a PLD within an electronic system in accordance with one embodiment of the invention.

It should be appreciated that a customer may receive the configured PLD to test within their electronic system as illustrated with reference to FIG. 3. Here, computer system 96 is used to monitor the performance of PLD 114 within electronic system 98. As the user may need to debug PLD 114 further, modifications to the program within the boot memory of the PLD may be required. The embodiments described below enable write commands to be accepted by the boot memory by temporarily transitioning the boot memory to act as a random access memory (RAM) and accept writes. It should be appreciated that the boot memory is set up to function as a ROM as that is the intended purpose of the final design. However, in order to debug the PLD in the system, the embodiments described herein enable the temporary transition of the boot memory to allow write capability to modify the data stored therein.

Figure 4:
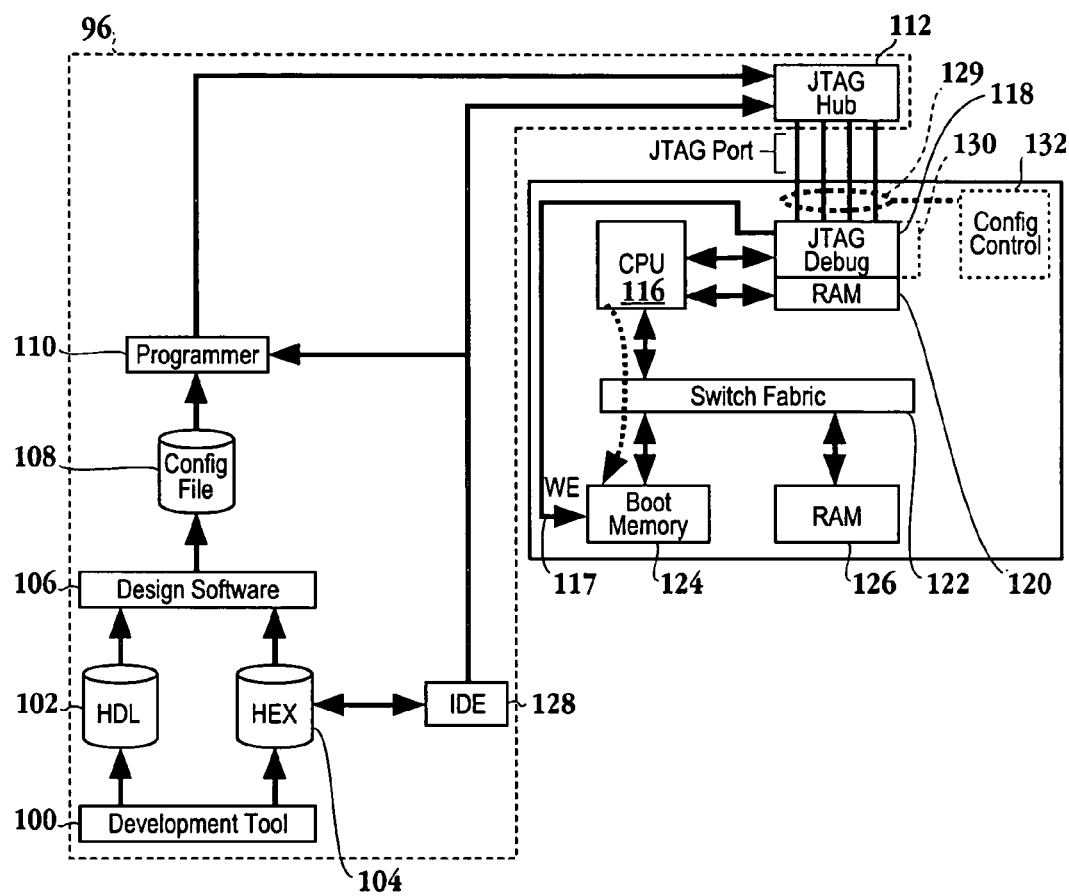
FIG. 4 is a simplified schematic diagram of a system capable of modifying a boot memory without performing a full hardware configuration of a programmable logic device in accordance with one embodiment of the invention.

FIG. 4 is a simplified schematic diagram of a system capable of performing a more efficient reconfiguration of a programmable logic device in accordance with one embodiment of the invention. Development tool 100 within computer system 96 is used to generate Verilog or VHDL files describing the configuration of the PLD. In one embodiment, development tool 100 is the SYSTEM ON A PROGRAMMABLE CHIP (SOPC) BUILDER owned by the assignee. Development tool 100 generates HDL and HEX files that are stored in storage medium 102 and 104, respectively. In one embodiment, the HEX file is initially generated as zeros and is then updated through integrated development environment (IDE) module 128. Design software module 106, e.g., the QUARTUS design software owned by the assignee, is then used to compile the HDL file from storage medium 102 and the HEX file from storage medium 104 and generate a configuration file in configuration file storage 108. The configuration file may be formatted as a programming object file (POF), which is a bit-stream file typically used for programming small flash or serial flash memory, or a serial object file (SOF), typically used for programming PLD 114 during development.

Still referring to FIG. 4, programmer module 110, which is an application that runs on the host in order to manipulate the Joint Test Action Group (JTAG) signals, accesses the configuration file from configuration file storage 108 to program PLD 114 through JTAG hub 112 and the JTAG port. Of course PLD 114 may be contained within an electronic system as illustrated with reference to FIG. 3. In one embodiment, the initial configuration of PLD 114 proceeds from JTAG hub 112 through the JTAG port over JTAG wires 129. From JTAG wires 129 the initial configuration is transmitted to configuration control circuitry 132, which would then configure all of the circuits in the PLD, including boot memory 124. It should be appreciated that JTAG hub 112 represents a software interface and either programmer module 110 or IDE module 128 may request services of the JTAG hub to get access to the JTAG port.

Having the updates proceed through configuration control circuitry 132 of FIG. 4 causes a complete hardware recompilation, which requires downtime on the part of the software engineer when performing debugging activities. In order to alleviate this bottleneck, IDE module 128 is configured to update HEX file in storage medium 104 with the desired contents, e.g., the update for the data stored in boot memory 124. It should be appreciated that storage medium 104 may store memory initialization files (MIF) format files also. As used herein, IDE module 128 refers to a programming environment that has been packaged as an application program, typically consisting of a code editor, a compiler, a debugger, and a graphical user interface (GUI) builder. IDE module 128 may be a standalone application or may be included as part of one or more existing and compatible applications. It should be further appreciated that IDE module 128 is configured to call programmer module 110 in one embodiment. IDE module 128 causes a breakpoint that enables the memories having read only capability of PLD 114 to be transitioned to accept writes. Here, the breakpoint triggers a write enable from JTAG debug module 118 to all memory modules having read only capability within PLD 114. Thus, boot memory 124 is enabled to receive writes as a result of the breakpoint communicated through JTAG hub 112 from IDE module 128.

It should be appreciated that the term breakpoint refers to a point in the code that causes execution to stop and JTAG debug module 118 to display on a suitable user interface an indication of where that point is in the execution of the code. Thereafter, the process may single-step for debugging purposes. In one embodiment, circuitry contained in hardware breakpoint module 130 is used to identify the breakpoint and trigger communication of the write enable signal boot memory 124 or any other suitable memory having read only capability. Here, the breakpoint causes the transfer of control to RAM 120, which has been initialized to accept data from JTAG hub 112. That is, the breakpoint causes transfer of execution to a hardwired break address pointing to a beginning address of RAM 120. Consequently, JTAG debug circuitry 118 issues a write enable signal to boot memory 124 over line 117, in order to transition the boot memory to accept write commands. Alternatively, software breakpoints may be incorporated into the code by updating boot memory 124 through IDE module 128 as discussed below. In any event, the breakpoint triggers the write enable signal to boot memory 124.

Thus, central processing unit (CPU) 116 is enabled to write into boot memory 124 through switch fabric 122, once the boot memory has been enabled to accept writes. CPU 116 will execute code within RAM 120 thereby causing an update from the JTAG port to boot memory 124. It should be appreciated that in a programmable logic device, such as a FPGA, the memory regions are configured initially as random access memory (RAM) regions, such as RAM 126, since the exact function of the memory regions are not known. ROM regions are then created from the RAM regions by disabling the write functionality as the PLD design is developed. For example, the write port to the RAM regions may be de-asserted. Thus, with respect to a PLD, the ROM regions can be transitioned between a read only state and a read and write capable state. Following the update being written to boot memory 124, JTAG debug circuitry 118 will issue a signal causing the boot memory, and any other memory which has been write enabled of PLD 114, to revert to a read only state, i.e., the write enable signals are turned off. In one embodiment, this signal is issued in response to a break return instruction. A reset signal then causes CPU 116 to begin in user mode or supervisor mode to cause the CPU to process instructions from boot memory 124.

As an alternative to hardware breakpoint circuitry 130, software breakpoints can be added through JTAG debug circuitry 118 by temporarily modifying the contents of boot memory 124. Thus, hardware breakpoint circuitry 130 is optional, since boot memory 124 may be modified through these software breakpoints, which are enabled by the ability of transitioning boot memory 124 to accept write commands. In turn, with respect to FPGAs, a smaller FPGA within a family of FPGAs may be selected if hardware breakpoint circuitry 130 is not necessary. Of course, if a customer desires a feature rich environment, hardware breakpoint circuitry 130 may be included. In one embodiment, hardware breakpoint circuitry includes registers, comparators, etc., that look at an execution address to determine if a certain instruction is about to execute to trigger a breakpoint. The ability to eliminate the hardware breakpoint circuitry will free up chip real estate to be used for other logic. Furthermore, the hardware breakpoint circuitry is limited in the number of breakpoints capable of being supplied because of the logic necessary for each breakpoint. On the other hand, through the embodiments described herein, an unlimited number of software breakpoints may be added to the code in the boot memory by enabling the boot memory to receive updates as described herein.

Figure 5:
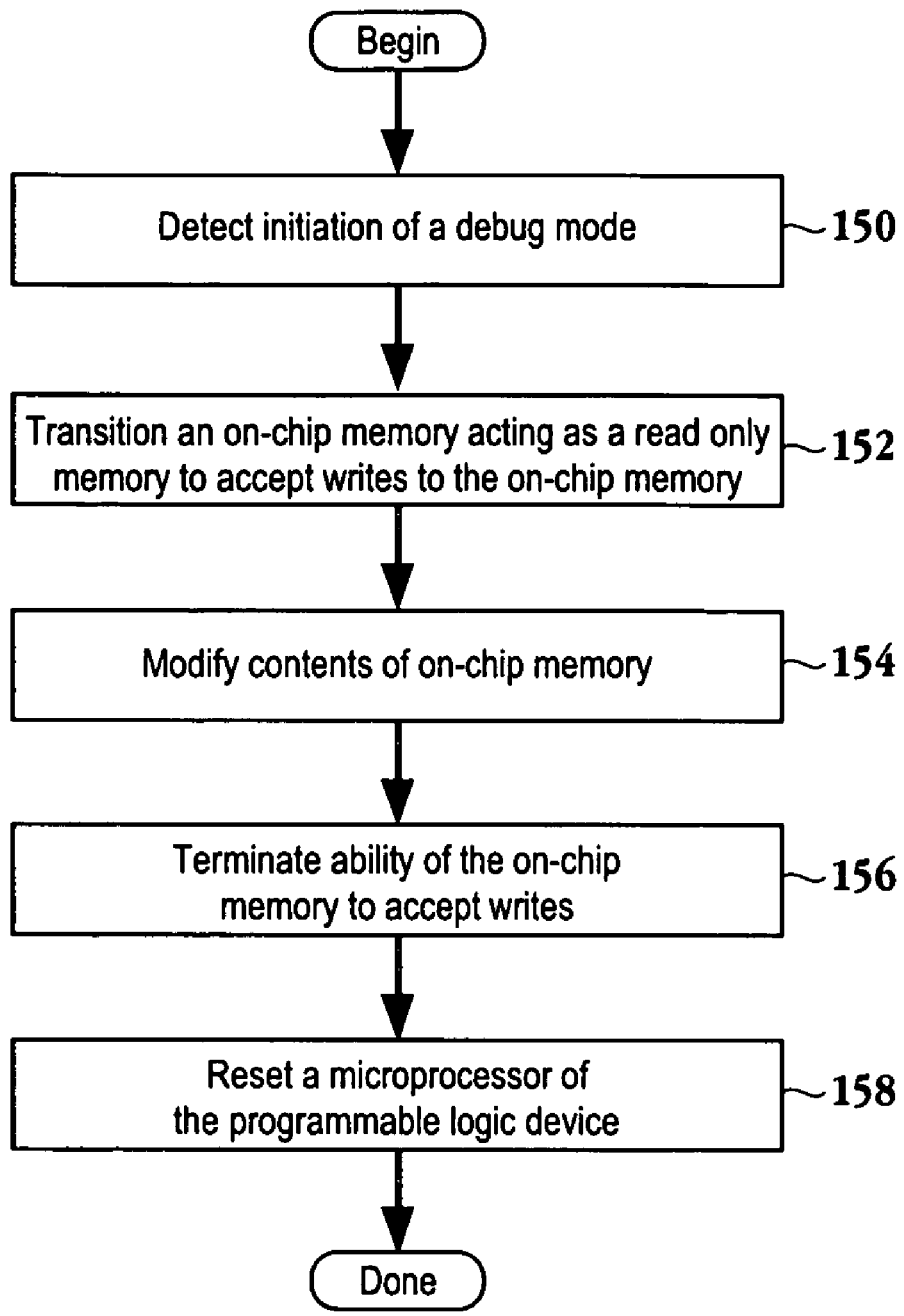
FIG. 5 is a flow chart diagram illustrating the method operations for debugging a programmable logic device in accordance with one embodiment of the invention.

FIG. 5 is a flow chart diagram illustrating the method operations for debugging a programmable logic device in accordance with one embodiment of the invention. The method commences with operation 150 where initiation of a debug mode is detected. For example, a software engineer may desire to edit the source code for the embedded system by modifying the HEX files, i.e., the boot memory content files, through an integrated development environment as discussed above. In one embodiment, detection of a breakpoint is used to detect the debug mode. It should be appreciated that the breakpoint may be either a hardware or a software breakpoint. The method then advances to operation 152 where in response to detecting an initiation of a debug mode, an on chip memory of the PLD having read only capability is transitioned to accept write commands to the on chip memory. In one embodiment, a write enable signal is issued by the JTAG debug module to transition the write port of the on chip memory. The method then proceeds to operation 154 where the contents of the on chip memory are modified. Here, the contents of the HEX file are downloaded to the boot memory as discussed with reference to FIG. 4. Of course, software breakpoints may be incorporated into the boot memory at this point.

The method of FIG. 5 then moves to operation 156 where the ability of the on-chip memory to accept writes is terminated. In one embodiment, the boot ROM is transitioned back to a read only memory through a break return signal. The break return signal causes the microprocessor of the PLD to reset in operation 158. In one embodiment, with reference to FIG. 4, a wire from the JTAG debug module to a reset pin of the microprocessor carries the reset signal, which causes the microprocessor to enter supervisor mode. Alternatively, the execution may continue from an address stored in a certain register in response to the break return. In turn, execution will begin at the boot location to process the modified data written into the on-chip memory.

In summary, the above-described invention provides a method and system for efficiently debugging a programmable logic device through an integrated development environment. The integrated development environment module in communication with the JTAG port causes the CPU to break, temporarily enables writing into the memory regions that have been programmed as having read only capability, updates the write enabled memory regions, and then causes a reset to begin execution out of an updated boot memory. The flexibility offered by the design of a PLD, such as a FPGA, is used to enable updating a boot memory by asserting a signal activating a write port associated with the boot memory. Since the read only memories of an FPGA are random access memories having the write port disabled, it is possible to debug the FPGA's memory having read only capability by making it a random access memory briefly when the debugger is active. Then, the debugger can update the memory data, or it can set software breakpoints in the data by temporarily modifying the memory contents. The transition of the memory regions having read only capability occurs through write enable circuitry issuing a signal to enable the write port of the memory regions during debugging.

The integrated circuit design being optimized through the above-described embodiments may be incorporated into a programmable logic device. The programmable logic device may be part of a data processing system that includes one or more of the following components: a processor, memory, I/O circuitry, and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. Additionally, the PLDs according to the present invention may be included in a processor that is part of an electronic system. The electronic system may be a digital computing system such as a general or special purpose computer, or a specialized digital switching network, or other processing system.

The invention can also be embodied as computer readable code on a computer readable medium. The computer readable medium is any data storage device that can store data, which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for debugging an integrated circuit (IC), comprising method operations of:
defining an on-chip random access memory (RAM) to function as a read only memory (ROM) boot memory;
detecting initiation of a debug mode;
transitioning the on-chip RAM memory to function as a RAM memory while in debug mode to accept writes to the on-chip RAM memory;
modifying contents of the on-chip RAM memory;
terminating the debug mode; and
transitioning the on-chip RAM memory to function as a ROM boot memory.

2. The method of claim 1, wherein the method operation of transitioning the on-chip RAM memory to function as a RAM memory further includes,
issuing a signal enabling access to modify the contents of the on chip RAM memory.

3. The method of claim 2 wherein the signal is a write enable signal.

4. The method of claim 1, wherein the method operation of modifying the contents of the on-chip RAM memory includes,
writing to the contents of the on-chip RAM memory through a Joint Test Action Group (JTAG) debug module, the JTAG debug module being connected to the on-chip RAM memory; and
incorporating software breakpoints to the contents of the on-chip RAM memory.

5. The method of claim 1, wherein the method operation of detecting initiation of a debug mode includes,
recognizing a software breakpoint.

6. The method of claim 1, further comprising:
resetting a microprocessor of the IC after transitioning the on-chip RAM memory to function as a ROM memory; and
executing the modified contents of the on-chip RAM memory through the microprocessor during a boot sequence of the microprocessor.

7. The method of claim 1, wherein the method operation of detecting initiation of a debug mode includes,
executing a break instruction to trigger the transitioning of the on chip RAM memory to function as a RAM memory.

8. A tangible computer readable medium having program instructions for debugging an IC, comprising:
program instructions for defining an on-chip RAM memory to function as ROM boot memory;
program instructions for detecting initiation of a debug mode;
program instructions for transitioning the on-chip RAM memory to function as a RAM memory while in debug mode to accept writes to the on-chip memory;
program instructions for modifying contents of the on-chip RAM memory; and
program instructions for terminating the debug mode and the modification capability of the on-chip RAM memory.

9. The tangible computer readable medium of claim 8, wherein the program instructions for transitioning the on-chip RAM memory includes,
program instructions for issuing a signal enabling modification of the contents of the on-chip RAM memory.

10. The tangible computer readable medium of claim 9 wherein the signal is a write enable signal.

11. The tangible computer readable medium of claim 8, wherein the program instructions for modifying the contents of the on-chip RAM memory includes,
program instructions for writing to the contents of the on-chip RAM memory through Joint Test Action Group (JTAG) debug module; and
program instructions for incorporating software breakpoints to the contents of the on-chip RAM memory.

12. The tangible computer readable medium of claim 8, wherein the program instructions for detecting initiation of a debug mode includes,
program instructions for recognizing a software breakpoint.

13. The tangible computer readable medium of claim 8, further comprising:
program instructions for resetting a microprocessor of the IC after terminating the debug mode; and
program instructions for executing the modified contents of the on-chip RAM memory during a boot sequence of the microprocessor.

14. The tangible computer readable medium of claim 8, wherein the program instructions for detecting initiation of a debug mode includes,
program instructions for executing a break instruction to trigger the transitioning of the on-chip RAM memory.

15. An integrated circuit (IC), comprising:
a microprocessing unit (MPU);
a memory region acting as a read only memory in a first state; and
a Joint Test Action Group (JTAG) debug module able to detect a breakpoint causing an interruption of a processing sequence executed by the MPU, the JTAG debug module is in communication with the memory region, the JTAG debug module having write control circuitry to control writes to the memory region, the write control circuitry issuing a signal enabling the memory region to transition to a second state where the memory region acts as a RAM memory to accept data from the MPU in response to the breakpoint occurring.

16. The IC of claim 15, wherein the JTAG debug module includes hardware breakpoint circuitry, the hardware breakpoint circuitry issuing the breakpoint in response to instructions being executed by the MPU.

17. The IC of claim 15, further comprising:
switch fabric enabling a data pathway between the MPU and the memory region.

18. The IC of claim 15, further comprising:
a control line from the write control circuitry to the memory region for carrying the signal to transition the memory region between the first state and the second state.

19. The IC of claim 15, wherein the JTAG debug module includes a random access memory region.

20. The IC of claim 15, wherein the JTAG debug module interfaces with a host system for debugging the IC through 4 JTAG leads, the 4 JTAG leads controlled through a JTAG software hub, the JTAG software hub receiving signals from an integrated development environment (IDE) module.

* * * * *

UNITED STATES PATENT AND TRADEMARK OFFICE
CERTIFICATE OF CORRECTION

PATENT NO. : 7,584,456 B1 Page 1 of 1
APPLICATION NO. : 11/035699
DATED : September 1, 2009
INVENTOR(S) : Veenstra et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1267 days.

Signed and Sealed this

Fourteenth Day of September, 2010

David J. Kappos
*Director of the United States Patent and Trademark Office*